(12) United States Patent
Donovan et al.

(10) Patent No.: US 9,053,315 B2
(45) Date of Patent: Jun. 9, 2015

(54) TRUSTED SYSTEM NETWORK

(75) Inventors: Robert J. Donovan, Rochester, MN (US); Joseph C. Lindsay, Rochester, MN (US); Randall S. Nelson, Rochester, MN (US); Christopher A. Peterson, Rochester, MN (US); Darrel W. Raknerud, Rochester, MN (US); Taylor L. Schreck, Rochester, MN (US); Judith Trousdell, Rochester, MN (US); Lee H. Wilson, Austin, TX (US); John C. Wingertsman, III, Rochester, MN (US); Andrew W. Wojtowicz, Dodge Center, MN (US); Tokunbo Adeshiyan, Raleigh, NC (US)

(73) Assignee: Lenova Enterprise Solutions (Singapore) Pte. Ltd., Singapore (SG)

( * ) Notice: Subject to any disclaimer, the term of this patent is extended or adjusted under 35 U.S.C. 154(b) by 322 days.

(21) Appl. No.: 13/536,570

(22) Filed: Jun. 28, 2012

(65) Prior Publication Data
US 2014/0006793 A1   Jan. 2, 2014

(51) Int. Cl.
*H01L 29/00*   (2006.01)
*G06F 21/42*   (2013.01)
*G06F 21/57*   (2013.01)

(52) U.S. Cl.
CPC ............ *G06F 21/42* (2013.01); *G06F 21/57* (2013.01); *G06F 2221/2129* (2013.01); *G06F 2221/2107* (2013.01)

(58) Field of Classification Search
CPC . G06F 21/42; G06F 21/57; G06F 2221/2129; G06F 2221/2107
See application file for complete search history.

(56) References Cited

U.S. PATENT DOCUMENTS

| 6,330,670 | B1 | 12/2001 | England et al. |
| 7,117,349 | B2* | 10/2006 | Chu et al. ......................... 713/1 |
| 7,444,505 | B2 | 10/2008 | Burcham et al. |
| 8,254,579 | B1* | 8/2012 | Morgan et al. ............... 380/278 |
| 2006/0236371 | A1 | 10/2006 | Fish |
| 2008/0060068 | A1* | 3/2008 | Mabayoje et al. ............... 726/9 |
| 2009/0288161 | A1 | 11/2009 | Wei et al. |

OTHER PUBLICATIONS

Anonymous, "Secure and Authenticated Delivery of Metered and/or Energy Information Data via Untrusted Networks", http://www.ip.com/pubview/IPCOM000144615D, Jan. 2, 2007.

(Continued)

*Primary Examiner* — Jeffrey Pwu
*Assistant Examiner* — Helai Salehi
(74) *Attorney, Agent, or Firm* — Patterson & Sheridan, LLP

(57) ABSTRACT

A method, system, and computer-readable storage media for granting a device access to a managed group are disclosed. Identification information may be exchanged between a management device in the managed group and a managed device through a secure first channel. If the identification information is verified by the management device, the managed device may be granted access to the managed group through the secure first channel. If access is granted, the managed device may access the managed group through a secure communication session on a network. If the identification information is not verified, the management device may send a cryptographic key to the managed device through the secure first channel. The cryptographic key may be used to create an encrypted communication session between the managed device and management device over the network.

24 Claims, 8 Drawing Sheets

(56) References Cited

OTHER PUBLICATIONS

Anonymous, "Method for splitting authentication data across multiple transports/devices when at least one transport is untrusted", http://priorartdatabase.com/IPCOM/000204793, Mar. 10, 2011.

Phoenix et al., "Secure execution environment for untrusted programs using debugger technology", http://www.ip.com/pubview/IPCOM000009145D, Aug. 9, 2002.

Pierson et al., "Protection of Distributed Internetworked Computers", Proceeding of the IEEE 39th International Carnahan Conference on Security Technology, Oct. 11-14, 2005, Paper appears in Security Technology 2005 CCST '05 39th Annual 2005 International Carnahan Conference, pp. 212-215. DOI: 10.1109/CCST.2005.1594882.

\* cited by examiner

TRUSTED SYSTEM NETWORK

TECHNICAL FIELD

Embodiments described herein generally relate to computer systems, and more specifically, to secure communications between computer systems within a network.

BACKGROUND

Modern computer systems are often constructed using the server model as a basis; a common modern form of these is the blade center model. These blade center systems consist of a common equipment rack housing multiple computer processors on individual boards (i.e. "mother" or "processor" boards). Each of the individual blades may contain processors and memory, allowing it to function as a separate computer or as part of a system of blades dedicated to specific tasks. The blade center often shares some common components beyond the physical rack housing the blades; this may include components of the cooling system and power supplies. Since often some of the individual blades, and thus their processors, are dedicated to serving a single function, client, or customer, the blades and their processors may be linked together in a network to serve the common functionality or to share common resources such as external network connections.

SUMMARY

In one embodiment, a method is provided for granting a managed device access to a managed group. The method includes exchanging identification information between a management device and the managed device through a secure first channel. If the identification information is verified by the management device, access may be granted to the managed device through the secure first channel so that it may access the managed group using a secure communication session on a network.

In another embodiment, a system is provided for enabling secure communication between devices within a system. The system includes at least one managed device and one management device, and may include a multiple of either. The system further includes a secure first channel coupling the managed device with the management device. The secure first channel may be used to exchange identification information. The system also includes a network coupling the management device with the managed device. The network may be used by the managed device to access the managed group through a secure communication session if the identification information provided via the secure first channel is verified.

BRIEF DESCRIPTION OF THE DRAWINGS

Embodiments are illustrated by way of example, and not by way of limitation, in the figures of the accompanying drawings in which like reference numerals refer to similar elements or steps.

DETAILED DESCRIPTION

Figure 1A:
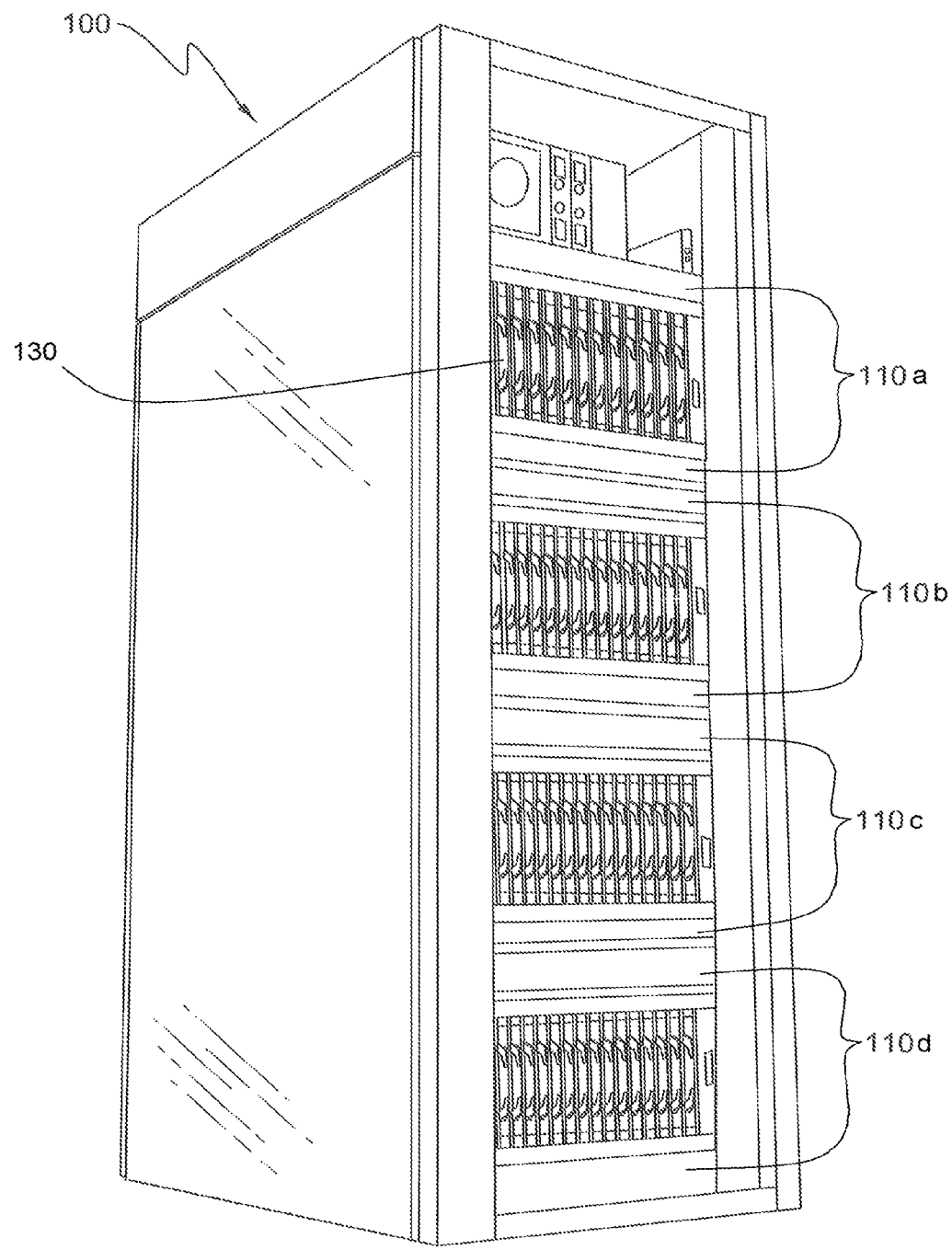
FIG. 1A depicts one embodiment of an electronics rack employing a stack of electronic subsystem chassis, each electronics subsystem chassis including a plurality of removable blades.

Features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments may be practiced and to further enable those of skill in the art to practice the invention. It is also to be understood that the descriptions of the embodiments are provided by way of example only, and are not intended to limit the scope of this invention as claimed.

As used herein, the term "network" is any combination of devices such as hardware, components, and computers interconnected by communication channels and connections that allow sharing of resources and information, where at least one process in one device is able to send data to or receive data from at least one other process residing in a different device. These networks often allow for the addition to or replacement of devices within the network. These devices are electronic systems such as, but not limited to, personal computers, printers, fax machines, telephones, PDAs, scanners, disk arrays, tape libraries, optical jukeboxes, and blades in a multi-blade center system. In one embodiment, a network may be an electronics rack having one or more multi-blade center systems disposed therein, with each multi-blade center system being an example of an electronic subsystem chassis containing a plurality of electronic devices (e.g. removable blades). As used herein, "electronic subsystem chassis" refers to any sub-housing, drawer, or compartment, containing one or more electronic devices of a network, such as electronic racks.

As used herein, a "managed group" is a combination of devices interconnected by one or more communication channels and one or more networks that allow sharing of resources and information where at least one process in one device is able to send data to or receive data from at least one other process residing in a different device, and this sharing of resources and information is controlled by one or more management devices. In one embodiment, secure communication sessions between devices in the managed group requires that authorization be granted by a management device and that the authorization be presented to another device. This authorization may be, but is not limited to, a certificate signed by a management device or a copy of the management device certificate. In this embodiment of a managed group, the managed devices may not communicate with devices not presenting the authorization.

Many modern computer installations now use electronic blade center racks, such as rack 100 shown in FIG. 1A. Each rack 100 typically includes two or more electronic subsystem chassis 110a-110d in a stacked configuration. Each electronic subsystem chassis 110 includes a plurality of removable blades 130. The blade center racks 100 enable computer systems to achieve a higher electronic component density, increased modularity, and enhanced serviceability over legacy computer systems.

Figure 1B:
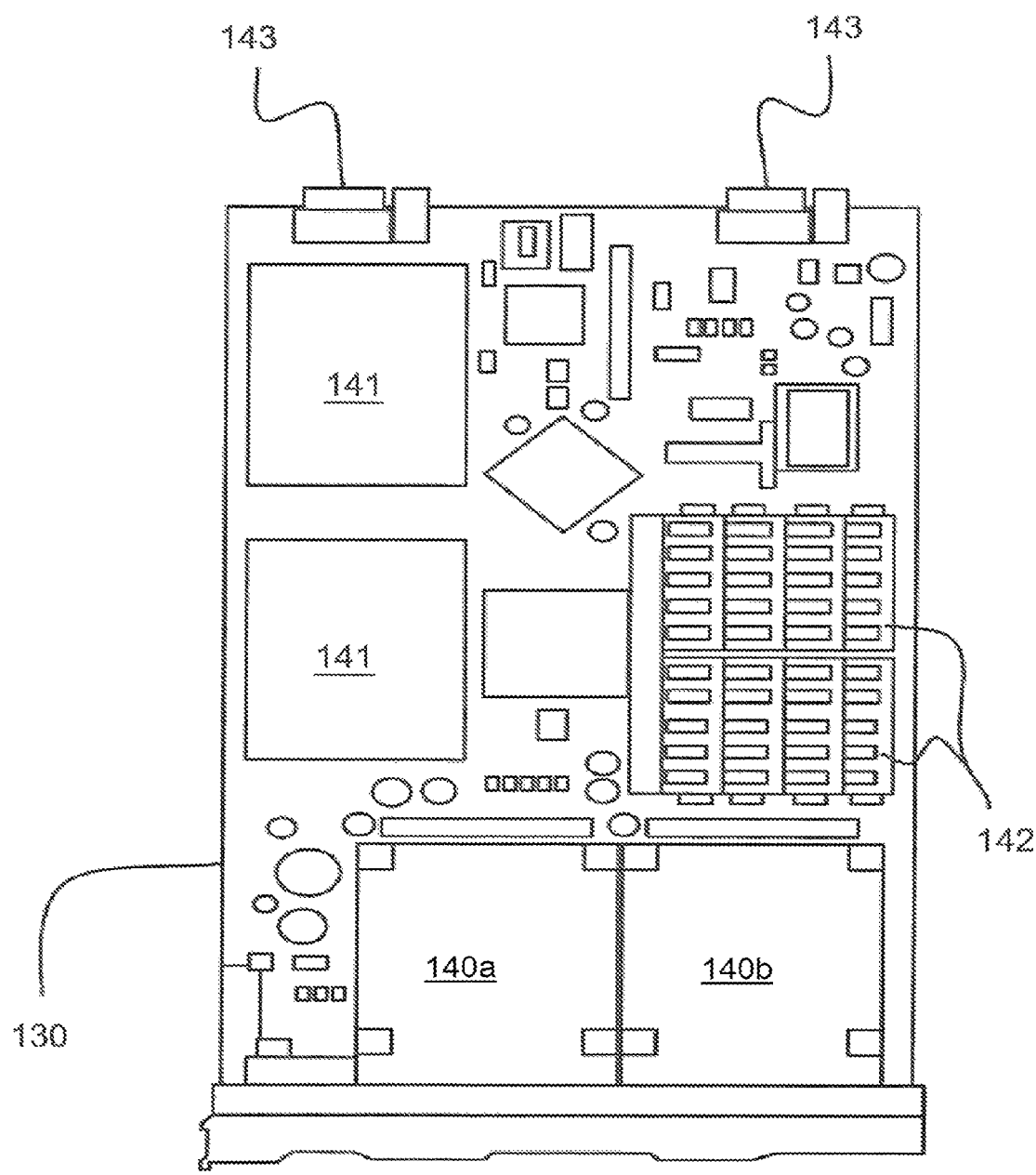
FIG. 1B is a side elevational view of one embodiment of the removable blade of FIG. 1A, in accordance with the present invention.

FIG. 1B depicts one embodiment of removable blade 130 of the electronic subsystem chassis (FIG. 1A, 110). Removable blade 130 may include, for example, at least one processor, such as main processor 140a and auxiliary processor 140b in the illustration. In the illustrated embodiment, the auxiliary processor 140b may be responsible for the boot-up sequence for the blade and allow for minimal functionality within the blade at low power levels while the main processor 140b controls or performs the primary workload that the blade performs for the managed group. In this example, a removable blade 130 may be a complete computer system or device that may include, for example, Direct Access Storage Devices (DASD) 141 and Dual In-Line Memory Modules (DIMMs) 142. Electrical connectors 143 are further provided for electrically connecting blade 130 to the respective electronic subsystem chassis 110 (FIG. 1A) via a backplane. The electrical connectors 143 typically include network connectors including, but not limited to, serial, parallel, and Ethernet connectors, for example, which enable blade 130 to communicate with other blades within the electronic subsystem chassis 110 and also with other computing devices residing outside of the chassis 110a or outside of the blade center 100. Corresponding electrical mating connectors are disposed along the backplane of the electronic subsystem chassis 110 for making electrical connections to the blade 130 when it is inserted into the chassis in an operational position.

Figure 2:
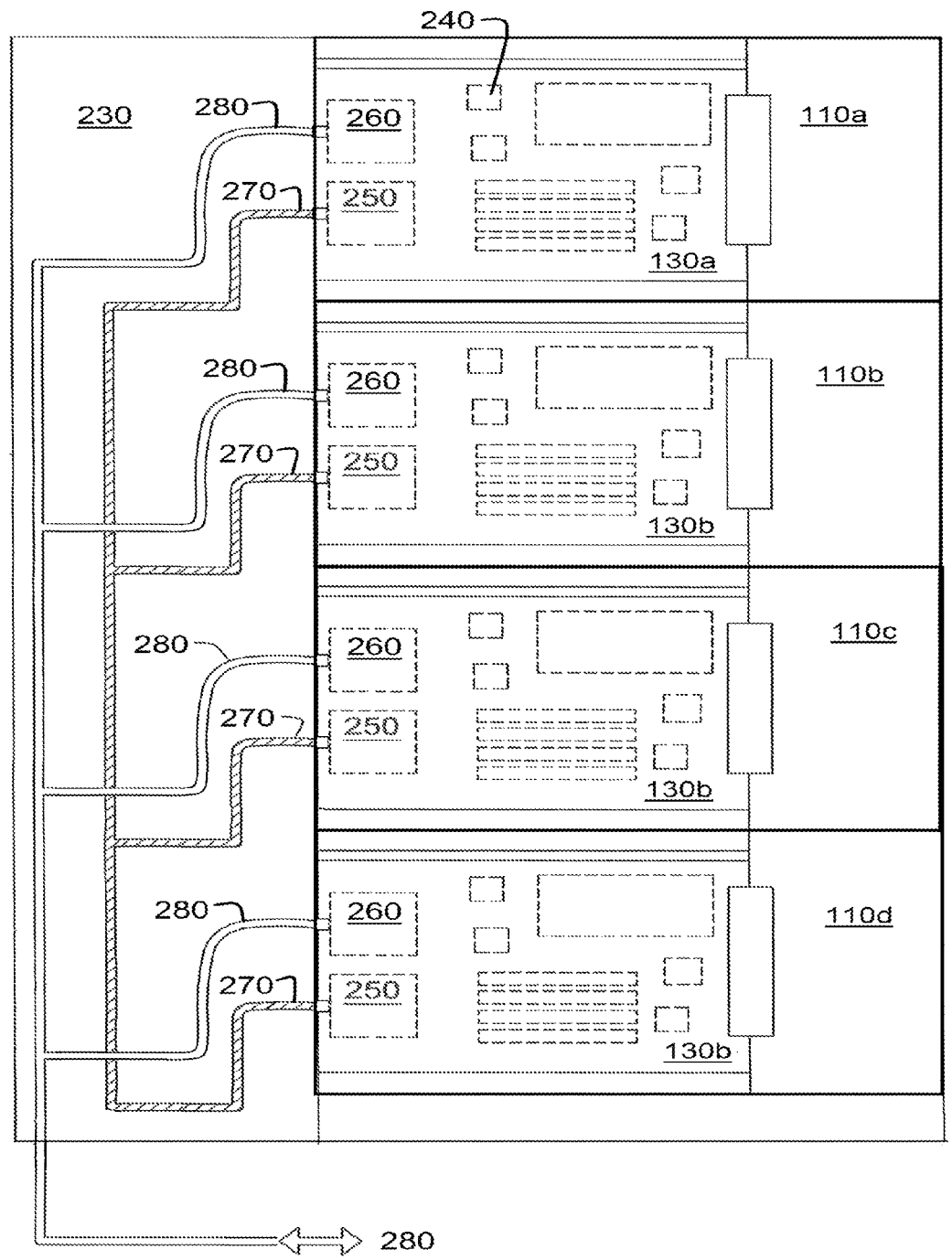
FIG. 2 is a simplified, high level schematic of one embodiment of the electronics subsystem chassis, comprising a plurality of removable blades having multiple electronic connections, in accordance with the present invention.

FIG. 2 is a schematic of one embodiment of blade electronic subsystem chassis, generally denoted 110, in accordance with the one embodiment. Each subsystem chassis 110 has a plurality of blades (130a and 130b, collectively referred to as 130) installed therein. Electronic subsystem chassis 110 includes a backplane 230, into which the respective removable blades 130 are electronically connected.

The blades 130 may be of two types in the example of FIG. 2, a management device 130a, and a managed devices 130b. Management device 130a is different from the managed devices 130b in that the management device is designated to coordinate and control communications with managed devices. The functions performed by the management device 130a may include, for example, managing workload distribution, distribution of data, and granting of access to a managed group of devices. In one embodiment, management device 130a may manage one or more managed devices 130b (i.e. blades) in different electronic subsystems chassis 110, or even in different racks 100. Management device 130a may optionally include a memory 240 having identification records used in determining whether to grant access to managed devices 130b in the managed group. In other embodiments, memory 240 may reside in other suitable locations, such as within the blade system chassis, on other connected devices, or within a network cloud. As illustrated, there may be a single management device 130a, however, it is contemplated that more than one management device 130a may be used. In another embodiment, a management device may function as a managed device when attempting to join a managed group.

In the illustrated embodiment, two types of inter-blade connections are shown, a secure first channel 270 using a first connector 250, and a network 280 using a second connector 260. These connectors 250 and 260 typically reside within electrical connectors 143 previously shown in FIG. 1B. Electrical connectors 143 are provided for electrically connecting the blade 130 to the electronic sub-system chassis 110 (FIG. 1B). The first and second connectors, 250 and 260 respectively, of each blade 130 couple directly to the backplane 230 of the electronic sub-system chassis 110. In one embodiment, the secure first channel 270 may be secure as it cannot be accessed by devices outside of a known set of management devices 130a and managed devices 130b. The secure first channel 270 may include a transmission media that is only coupled with known devices. For example, the secure first channel 270 may only couple devices of the same electronic subsystem chassis 110 or rack 100. The known devices may be managed so that only trusted and authorized software may be installed on them. The known devices may be known to not have network or protocol analyzing or sniffing software. As another example, the secure first channel 270 may only couple known devices that are physically located in the same computer room or facility. In various embodiments, the secure first channel 270 is secure due to physical control and security procedures used to oversee access to its components. For example, the entire secure first channel 270 may be located within a chassis 110 or a rack 100. In another embodiment, the entire secure first channel 270 may be located within the same computer room or facility, and the facility may have procedures and controls designed to prevent access by unauthorized persons. As one example, the facility may be locked. In another example, the security procedures and controls of the computer room may prevent the installation of computer hardware that intercepts or monitors communications on the secure first channel 270.

In one embodiment, the secure first channel 270 may be used for communicating identification information between a managed device 130a and one or more management devices 130b. The managed device 130b and one or more management devices 130a may also be coupled by a network 280. This network 280 is also shown as being built into the backplane 230 of the electronic sub-system chassis 110 but in other embodiments, alternate interconnection types may also be employed. The network 280 may extend outside of the backplane 230 as shown in FIG. 2. The network 280 may extend to other racks 100 located in the same computer room or facility. In various embodiments, the network 280 may extend outside the computer room or facility where the backplane 230 is located. Network 280 may not inherently be secure as devices other than the management device 130a or managed devices 130b may access the network 280. In addition, the network 280 may not inherently be secure because all or part of the communication media may be in a location not having procedures and controls designed to prevent access by unauthorized persons or devices. For example, the network media may be a cable that is routed through a public space or other space not having controlled access. In addition, while the network 280 is shown in FIG. 2 as a cable, in various embodiments the network 280 may be a wireless network. Thus, secure communication between the managed device 130b and the management device 130a over the network 280 may depend on verification of identification information provided via the secure first connection 270.

In one embodiment, the secure first channel 270 utilizes an I2C or RS485 bus. The secure first channel 270 bus type is typically, but not necessarily, of a relatively low bandwidth, thus potentially limiting the amount of and speed at which data can be transferred over it. In one embodiment, network 280 utilizes a high speed bus such as a TCP/Ethernet connection which typically operates at a higher effective bandwidth relative to secure first channel 270. In various embodiments, the network 280 may employ wired, wireless, fiber optic, or other suitable media. As mentioned, the network 280 may not be a secure channel. Thus, in this instance, even though the secure first channel 270 may have limited bandwidth for the transmission of secure information, it may be used in an initial exchange of identification information between management device 130a and managed devices 130b, or in an exchange of encryption information, such that the higher bandwidth network 280 may subsequently be used for exchanging sensitive information in volumes requiring greater bandwidth than that provided by the secure first channel.

Figure 3:
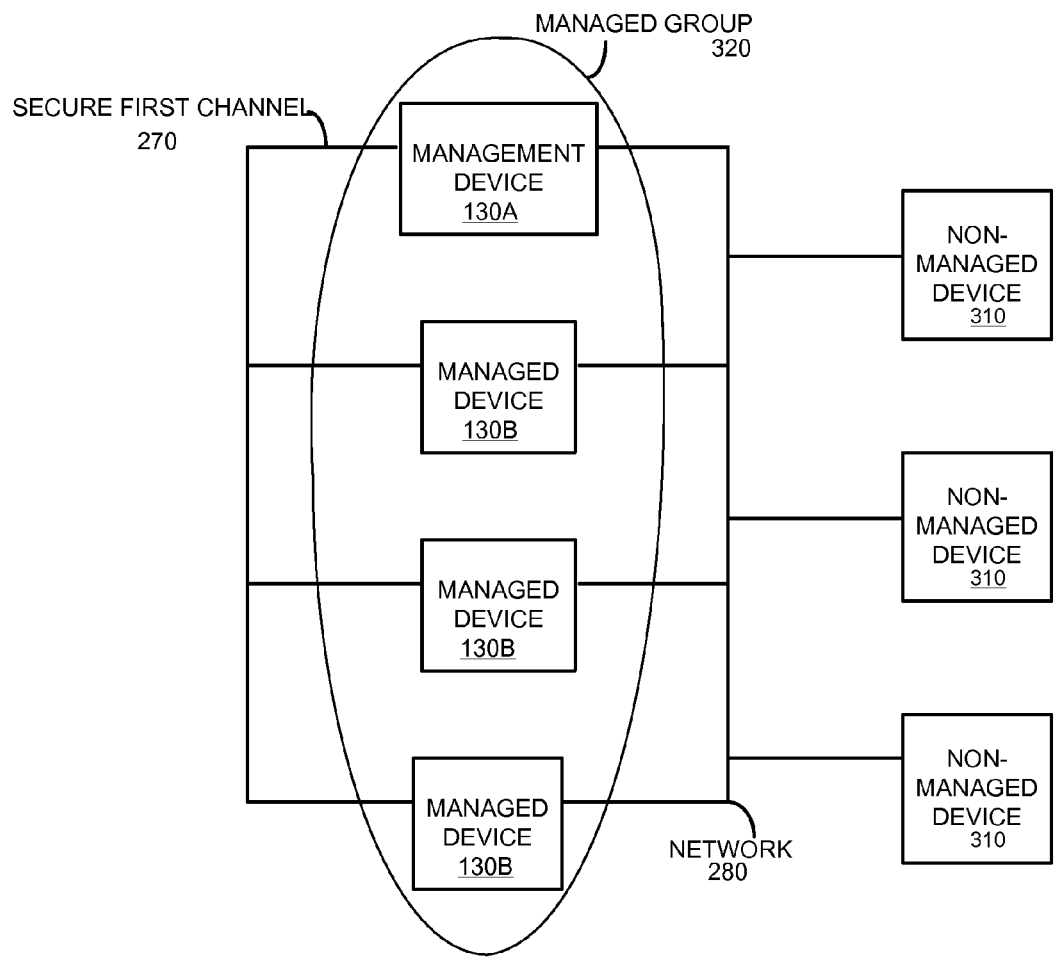
FIG. 3 is a simplified, high level system diagram of one embodiment of a management device and managed device connected with a secure first channel and a network, in accordance with the present invention.

FIG. 3 is a simplified, high level diagram of one embodiment of a system including a managed group 320 having the management device 130a and one or more managed devices 130b coupled via the secure first channel 270 and the network 280. As can be seen from the diagram, managed devices 130b and management device 130a may communicate through either the secure first channel 270 or through the network 280. In addition, one or more non-managed devices 310 may be coupled to the network 280. The presence of non-managed devices 310 may cause the network 280 to not be inherently secure.

Figure 4A:
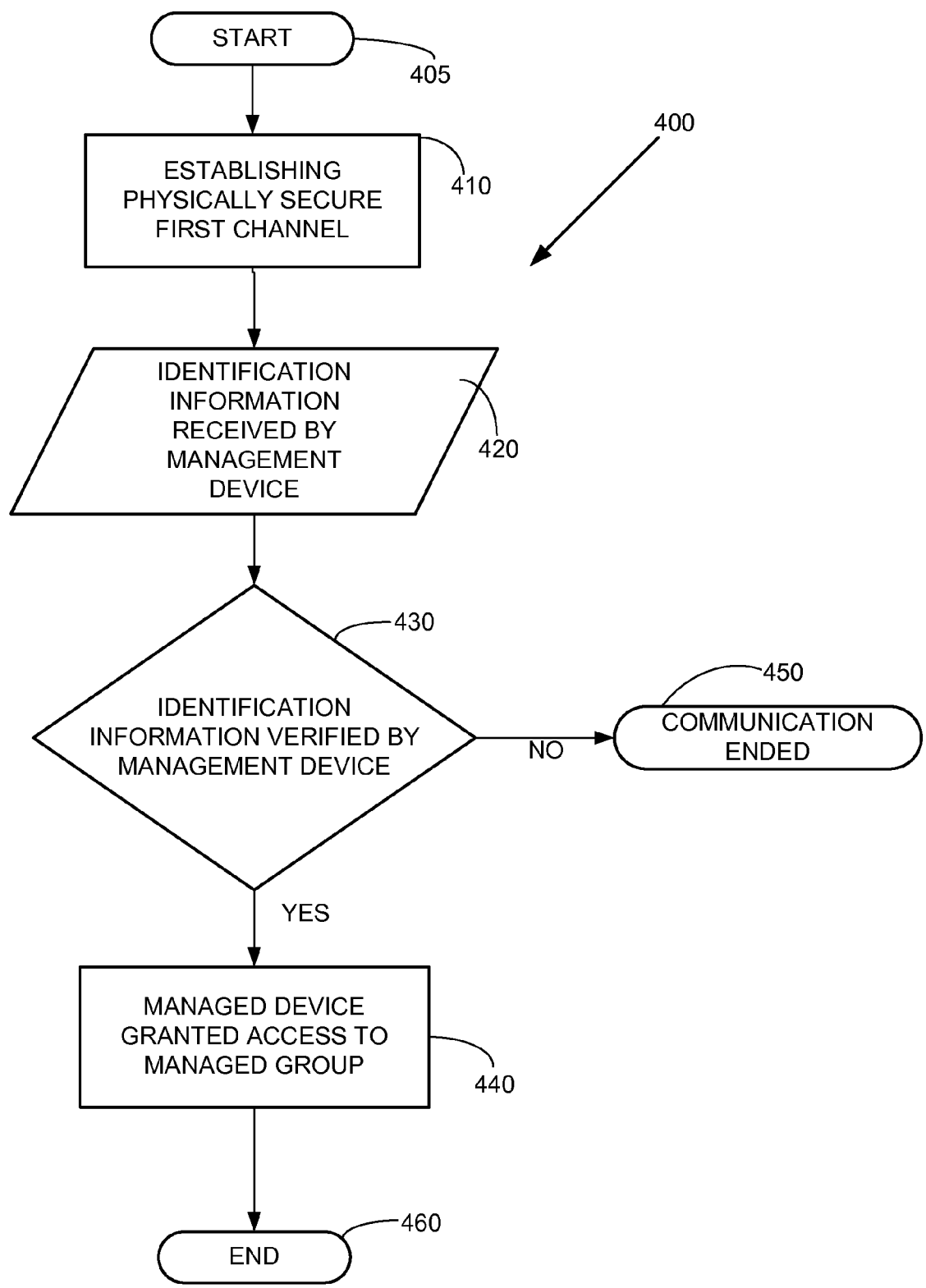
FIG. 4A is a flowchart of a method for granting a managed device to access a managed group controlled by a management device, in accordance with the present invention.

FIG. 4A is a flowchart of a method 400 for granting a managed device access to the managed group 320 controlled by a management device. The method outlined in FIG. 4A begins at block 405. At block 410 a first connection may be established using a secure first channel 270 between the management device 130a and the managed device 130b. An exchange of identification information over the secure first channel 270 may then occur as shown at block 420. The exchange of identification information may include the management device 130a receiving identification information from the managed device 130b. The identification information may include any of the following: date and time of last communication with the management device 130a, an IP address, port information, and a universally unique identifier (UUID). An Internet Protocol address (IP address) is a numerical label assigned to each device (e.g., computer, printer) participating in a computer network that uses the Internet Protocol for communication. A port is associated with an IP address of the host, as well as the type of protocol used for communication. UUID is a 128-bit number used to uniquely identify some object or entity on the Internet or a network. Depending on the specific mechanisms used, a UUID is either guaranteed to be different or is, at least, extremely likely to be different from any other UUID generated. The UUID relies upon a combination of components to ensure uniqueness. A guaranteed UUID contains a reference to the network address of the host that generated the UUID, a timestamp (a record of the precise time of a transaction), and a randomly generated component.

In block 430, identification information may be verified. If the identification information is verified by the management device 130a, the managed device 130b may be granted access into the managed group 320 using a network at block 440 and the method ends at block 460. In one embodiment, the granting of access to the managed group 320 includes providing the managed device 130b with a signed certificate to present to other managed devices 130b in the managed group 320 to prove it is authorized to participate in the managed group 320. The signed certificate may be used to establish a secure communication session on the network 280. If the identification information is not verified at block 430, then a variety of options may occur, including either ending communication with the device, as shown at block 450, or taking additional steps to grant the managed device 130b access to the managed group 320.

Figure 4B:
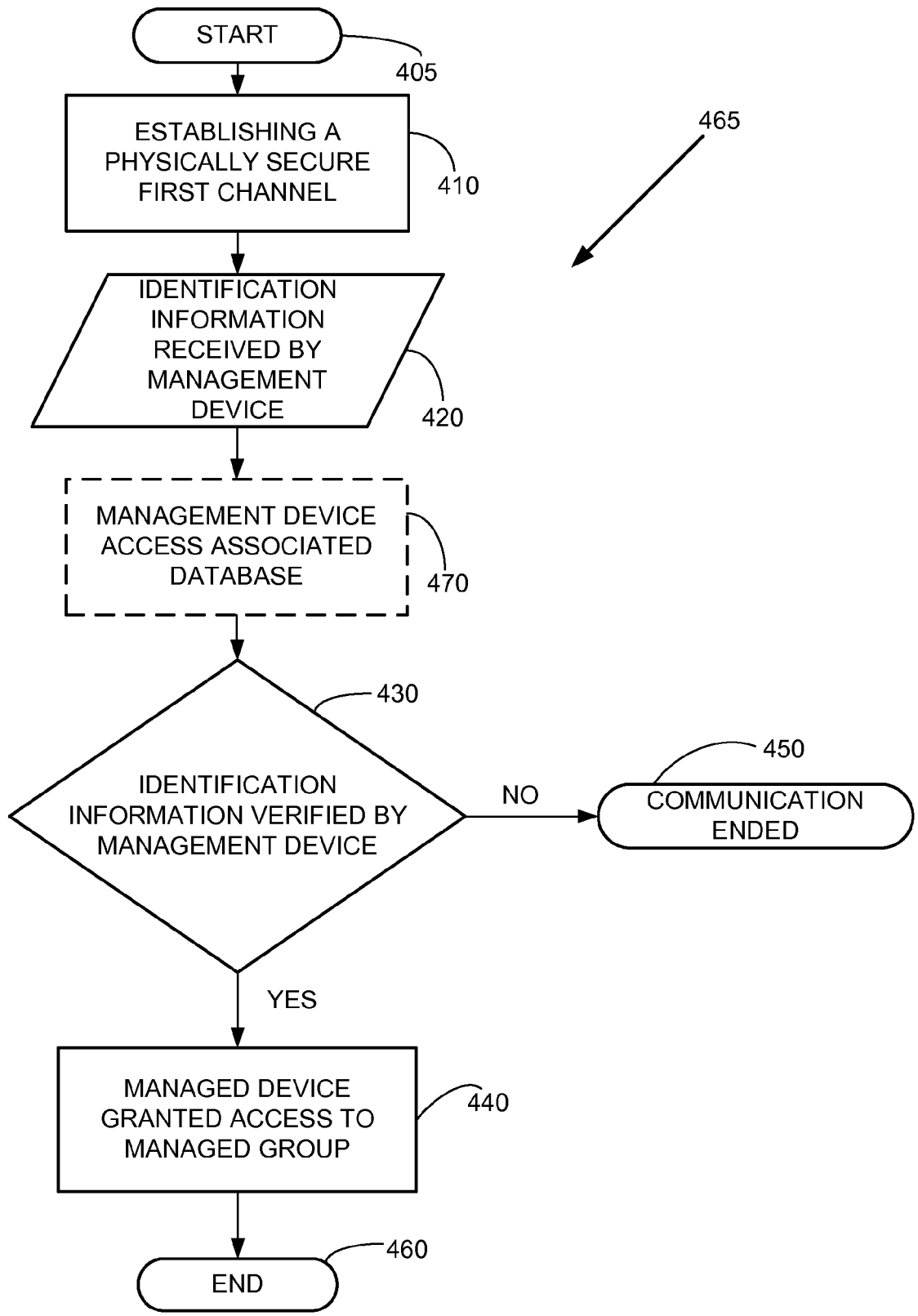
FIG. 4B is a flowchart of a method for granting a managed device access to a managed group controlled by a management device using an optional database, in accordance with the present invention.

FIG. 4B is a flowchart of an embodiment of a method 465 to grant a managed device access to a managed group 320 controlled by a management device using an optional database. The operations of the method 465 are generally the same as like-numbered operations of the method 400 (FIG. 4A). Method 465 varies from method 400 at block 470, where the management device 130a may access an associated memory 240 which contains an optional database to verify the received identification information. The database may be database 590 described below.

Figure 5:
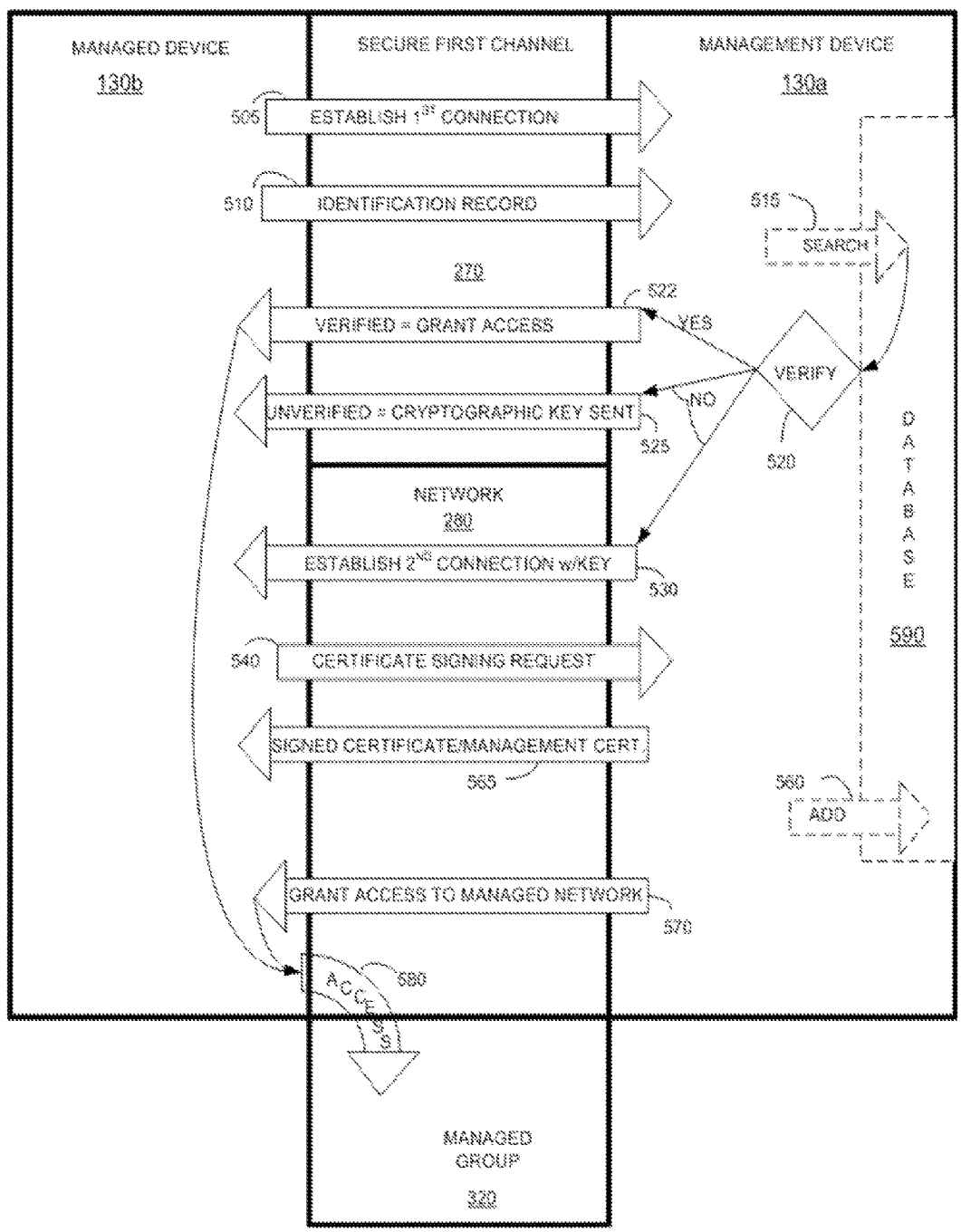
FIG. 5 is a data flow diagram of communications flowing between a managed device and a management device, in accordance with the present invention.

FIG. 5 is a data flow diagram of communications flowing between a management device 130a and a managed device 130b during a typical operational scenario. At operation 505, managed device 130b initiates and establishes a first connection with the management device 130a over the secure first channel 270. The connection may be initiated when the managed device is installed in the electronic subsystem chassis 110. In another embodiment, the connection may be established the first time managed device 130b attempts to access the management device. In yet another embodiment, the connection may be established when the both the management device 130a and the managed device 130b are powered up from an off state (i.e. a system boot). In another embodiment, the connection may be initiated by the management device when it is made aware of the presence of the managed device 130b. The operation of establishing a first connection 505 may also be performed at any desired time.

Once the connection over the secure first channel is completed, the managed device 130b transmits an identification record (i.e. identification information), as shown at operation 510, to the management device 130a. The identification record may take the form of, as an example, the managed device's 130b universally unique identifier (UUID), IP address, or any other form of information that identifies the managed device 130b to the management device 130a.

In operation 515 the management device 130a searches for the identification record in an optional database 590 in memory 240. The search result may be used by the management device 130a to verify the identification record provided by the managed device 130b in operation 520. In one embodiment, an identification record is verified if the identification record matches a record residing in the database 590 of the management device 130a. This may signify that the managed device 130b has previously successfully been granted access to the managed group 320. In another embodiment, the time and date of a previous granting of access to the managed device 130b may be determined. If access was granted within a particular preceding time period, the identification record may be verified. If the access was granted beyond the particular time period the identification record may be deemed "stale" and may be unverified in operation 520.

If the identification record is verified, the management device 130a grants, through the secure first channel 270, the managed device 130b access to the managed group 320 in operation 522. In operation 580, the managed device 130b may access the managed group 320 through the network 280 once granted access to the managed group 320. In other embodiments, operation 520 may include allowing auxiliary processor 140*b* of the device to complete a boot-up sequence. The operation 520 may also include the management device 130*a* increasing the electrical power provided to the managed device 130*b* so that the managed device 130*b* has sufficient power to operate main processor 140*a* and other components of managed device 130*b*. These are example processes that may occur upon the granting of access and are not intended to limit the present invention.

If the identification record is not verified, the management device 130*a* may take further steps to attempt to allow the managed device 130*b* access to the managed group 320 over the network 280. The management device 130*a* may transmit a cryptographic key to the managed device 130*b* through the secure first channel 270 in operation 525. The cryptographic key may be used to create an encrypted communication session through the network 280. The encrypted communication session may be used to exchange certificate information between the management device 130*a* and the managed device 130*b*. In one embodiment, this cryptographic key may be of an AES-256 type, a 32-byte (256-bit) randomly generated value, used to establishing an encrypted session over the network 280. In another embodiment, the cryptographic key may be of a proprietary type of the users choosing for creating the encrypted communication session over the network 280. These cryptographic keys may have a time limit in the duration they can be used.

In operation 530, the management device 130*a* uses the cryptographic key to establish an encrypted communication session over the network 280 between itself and the managed device 130*b*. In one possible embodiment, an AES-256 encrypted communication session may be established, and used for subsequent encrypted communication sessions for further exchange of certificate information.

Once an encrypted communication session on the network 280 is established, the managed device 130*b* may transmit a certificate signing request to management device 130*a* in operation 540. The management device 130*a* may return the certificate signed by the management device 130*a* along with a copy of the management device's management certificate in operation 565. A copy of the managed devices' 130*b* identification information may be added to the database 590 of memory 240 or other data repository, for future use in verification in operation 520, shown at operation 560. The management device's signed certificate may be used to identify the managed device 130*b* to other managed devices 130*b* and other management devices 130*a* in the managed group 320. In operation 570, management device 130*a* grants the managed device 130*b* access to the managed group 320 using the encrypted communication session over the network 280 that was established in operation 530.

Upon access being granted at operation 580, each managed device 130*b* has its own identifying certificate signed by the management device 130*a*, and a copy of the management device's certificate. These certificates allow, in one embodiment, secure communication sessions to be established with each device within the managed group 320 using Transport Layer Security (TLS) or Secure Socket Layer (SSL) protocols. These secure communication sessions can then be used to provision other sensitive management data, such as user names and passwords for Lightweight Directory Access Protocol (LDAP) servers, without the concern that the information could be extracted by a network sniffer somewhere else in the network. It also ensures that only managed devices 130*b* that have certificates signed by the management device 130*a* can send sensitive data to managed devices 130*b* in the managed group 320.

Figure 6:
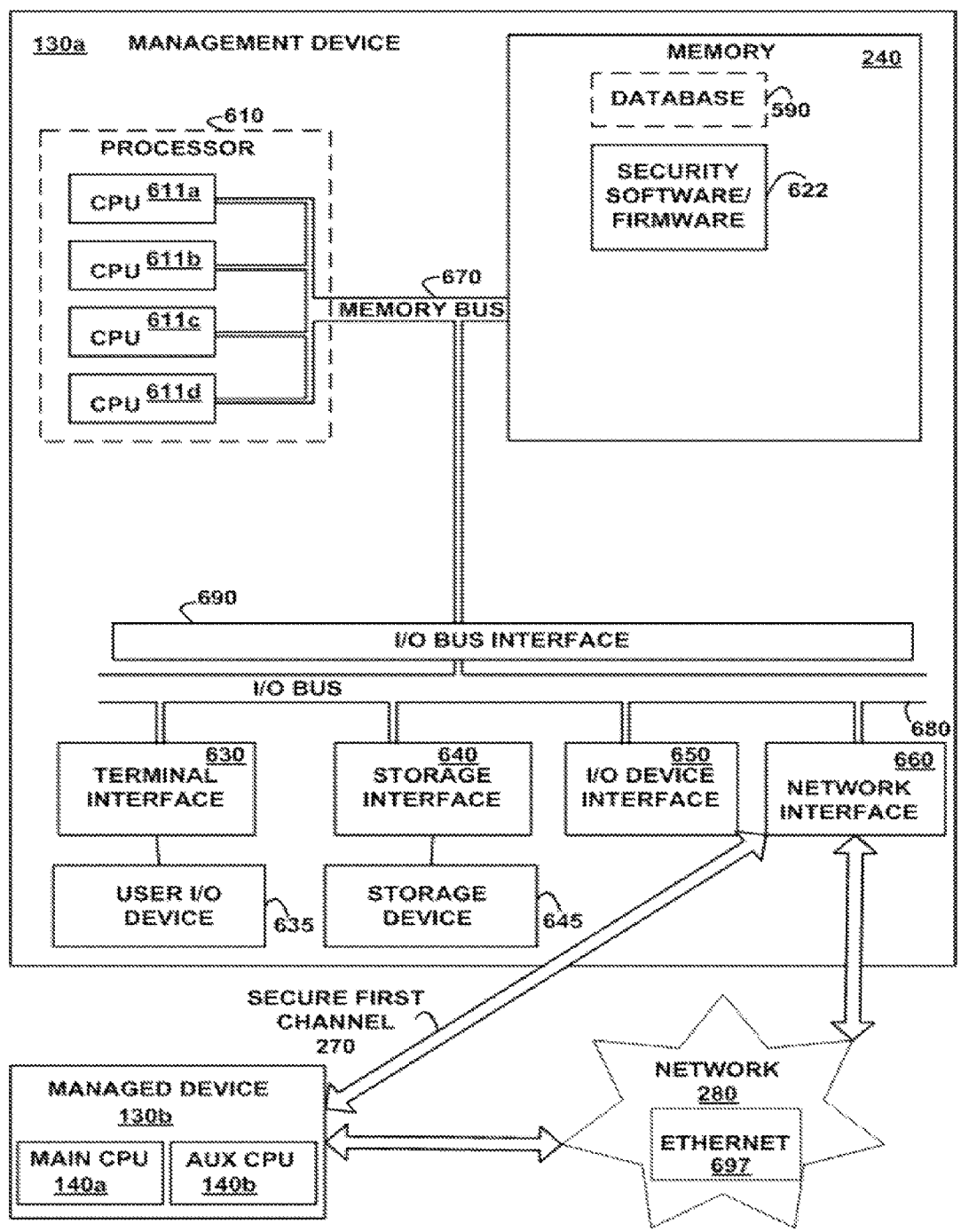
FIG. 6 depicts a high-level block diagram of a system for granting secure communications between a management device and a managed device within a network, in accordance with the present invention.

FIG. 6 depicts a high-level block diagram representation of a management device 130*a* connected to a managed device 130*b* via the secure first channel 270 and the network 280, according to an embodiment of the present invention. The terms "management" and "managed" are used herein for convenience only, and in various embodiments, a computer system that operates as a managed device in one environment may operate as a management device in another environment, and vice versa. The mechanisms and apparatus of embodiments of the present invention apply equally to any appropriate computing system.

In the illustrated embodiment, the management device 130*a* may be, or include a computer system, the major components of which comprise one or more processors 610, a memory 240, a terminal interface 630, a storage interface 640, an I/O (Input/Output) device interface 650, and a network interface 660, all of which are communicatively coupled, directly or indirectly, for inter-component communication via a memory bus 670, an I/O bus 680, and an I/O bus interface unit 690.

The management device 130*a* may contain one or more general-purpose programmable central processing units (CPUs) 611*a*, 611*b*, 611*c*, and 611*d*, herein generically referred to as the processor 610. In an embodiment, the management device 130*a* contains multiple processors typical of a relatively large system; however, in another embodiment the management device 130*a* may alternatively be a single CPU system. Each processor 610 executes instructions stored in the main memory 240 and may comprise one or more levels of on-board cache.

In an embodiment, the main memory 240 may comprise a random-access semiconductor memory, storage device, or storage medium (either volatile or non-volatile) for storing or encoding data and programs. In another embodiment, the memory 240 represents the entire virtual memory of the management device 130*a*, and may also include the virtual memory of other computer systems coupled to the management device 130*a* or connected via the network 280. The memory 240 is conceptually a single monolithic entity, but in other embodiments the memory 240 is a more complex arrangement, such as a hierarchy of caches and other memory devices. For example, memory may exist in multiple levels of caches, and these caches may be further divided by function, so that one cache holds instructions while another holds non-instruction data, which may be used by the processor or processors. Memory may be further distributed and associated with different CPUs or sets of CPUs, as is known in any of various so-called non-uniform memory access (NUMA) computer architectures.

In one embodiment the memory 240 stores or encodes an optional database 590 and security software/firmware 622, herein subsequently referred to as security software 622. Optional database 590 may contain information from managed devices 130*b* in the form of records needed to determine when managed group 320 communications can be made. The use of the database illustrated here is one of many possible embodiments and is used merely for convenience, and is not meant to limit the possible or alternative types of sources for verifying identification information that may be used without departing from the scope of the invention. The database security software 622 manages the communication between management device 130*a* and managed device 130*b*. In one embodiment, the database 590 may be, but is not limited to, non-volatile memory module containing records of identification information that may be acceptable to the managed device 130*a* for establishing secure communications. Managed device 130*b* also typically has security software or firmware to manage communications in conjunction with management device's 130*a* security software or firmware 622. In one embodiment, managed device 130*b* includes an auxiliary CPU 140*b* that may be used during blade boot up or when the managed device 130*b* is in a "sleep" mode. The managed device 130*b* may include a main CPU 140*a* that may be used when the blade is in normal operation mode. Security software 622 may compare the received identification information to the identification information contained in the database 590 for verification. Although the database 590 and security code 622 are illustrated as being contained within the memory 240 in the management device 130*a*, in other embodiments some or all of them may be stored elsewhere within management device 130*a* (e.g. on storage device 545), or on different computer systems, or a network cloud.

The memory bus 670 provides a data communication path for transferring data among the processor 610, the main memory 240, and the I/O bus interface 690. The I/O bus interface 690 is further coupled to the I/O bus 680 for transferring data to and from the various I/O units. The I/O bus interface unit 690 communicates with multiple I/O interface units 630, 640, 650, and 660, which are also known as I/O processors (IOPs) or I/O adapters (IOAs), through the I/O bus 680.

The I/O interface units support communication with a variety of storage and I/O devices. For example, the terminal interface unit 630 supports the attachment of one or more user I/O devices 635, which may include user output devices (such as a video display device, speaker, or television set) and user input devices (such as a keyboard, mouse, keypad, touchpad, trackball, buttons, light pen, or other pointing device). A user may manipulate the user input devices using a user interface, in order to provide input data and commands to the user I/O device 635 and the management device 130*a*, and may receive output data via the user output devices. For example, a user interface may be presented via the user I/O device 635, such as displayed on a display device, played via a speaker, or printed via a printer.

The storage interface 640 supports the attachment of one or more disk drives or direct access storage devices. In one embodiment, the storage device 645 may be implemented via any type of secondary storage device. The contents of the main memory 240, or any portion thereof, may be stored to and retrieved from the storage device 645, as needed. The I/O device interface 650 provides an interface to any of various other input/output devices or devices of other types, such as printers or fax machines. The network interface 660 provides two or more communications paths from the management device 130*a* to other digital devices and managed devices 130*b*; such paths may include one or more networks 280.

Although the memory bus 670 is shown in FIG. 6 as a relatively simple, single bus structure providing a direct communication path among the processors 610, the main memory 240, and the I/O bus interface 690, in fact the memory bus 670 may comprise multiple different buses or communication paths, which may be arranged in various forms, such as point-to-point links in hierarchical, star or web configurations, multiple hierarchical buses, parallel and redundant paths, or any other appropriate type of configuration. Furthermore, while the I/O bus interface 690 and the I/O bus 680 are shown as single respective units, the management device 130*a* may, in fact, contain multiple I/O bus interface units 690 and/or multiple I/O buses 680. While multiple I/O interface units are shown, which separate the I/O bus 680 from various communications paths running to the various I/O devices, in other embodiments some or all of the I/O devices are connected directly to one or more system I/O buses.

In various embodiments, the management device 130*a* is a multi-user mainframe computer system, a single-user system, a blade system, or a management device or similar device that has little or no direct user interface, but receives requests from other computer systems (clients). In other embodiments, the management device 130*a* is implemented as a desktop computer, portable computer, laptop or notebook computer, tablet computer, blade, appliance, or any other appropriate type of electronic device.

The secure first channel 270 may be generally secure as it may not be accessed by devices outside of a known set of management devices 130*a* and managed devices 130*b*. In one embodiment, the secure first channel 270 uses a bus type of I2C or RS485, but it is contemplated that other connection buses may be used without violating the scope and spirit of the present invention. These connections can be used to transmit the identification information securely without the concern that this information may be extracted by a network sniffer or other device elsewhere in the network. Once this information is verified by the management device 130*a* with the managed device 130*b*, a secure communication session may be established on the network 280 such as, but not limited to, the Ethernet 697. The network used may be any suitable network or combination of networks and may support any appropriate protocol suitable for communication of data and/or code to/from the management device 130*a* and the managed device 130*b*.

In various embodiments, managed devices 130*b* and management devices 130*a* may be connected directly or indirectly to the management group 320. In one embodiment, devices attached to the network may be coupled wirelessly. In another embodiment, the network may support hard-wired communications, such as a telephone line, fiber optics, or cable. In another embodiment, the network may be the Internet and may support IP (Internet Protocol). In another embodiment, the network is implemented as a local area network (LAN) or a wide area network (WAN). In another embodiment, the network is implemented as an intranet. In another embodiment, the network is implemented as any appropriate cellular data network, cell-based radio network technology, or wireless network. In another embodiment, the network is implemented as any suitable network or combination of networks. Although the Ethernet 597 is shown, in other embodiments any number of networks (of the same or different types) may be present.

FIG. 6 is intended to depict the representative major components of the management device 130*a*, the network 280, and the managed device 130*b*. But, individual components may have greater complexity than represented in FIG. 6, components other than or in addition to those shown in FIG. 6 may be present, and the number, type, and configuration of such components may vary. Several particular examples of such additional complexity or additional variations are disclosed herein; these are by way of example only and are not necessarily the only such variations. The various program components illustrated in FIG. 6 and implementing various embodiments of the invention may be implemented in a number of manners, including using various computer applications, routines, components, programs, objects, modules, data structures, and are referred to hereinafter as "computer programs," or simply "programs."

The computer programs may include one or more instructions or statements that are resident at various times in various memory and storage devices in the management device 130*a* or the managed device 130*b* and that, when read and executed by one or more processors or when interpreted by instructions that are executed by one or more processors, cause one or both devices to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, which are stored in a storage device), or an embodiment combining program and hardware aspects that may all generally be referred to herein as a "circuit," "module," or "system." Further, embodiments of the invention may take the form of a computer program product embodied in one or more computer-readable storage medium having computer-readable program code embodied thereon.

A combination of one or more computer-readable storage medium may be utilized. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: a portable computer diskette, a hard disk (e.g., the storage device 645), a random access memory (RAM) (e.g., the memory 240), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

Computer program code for carrying out operations for aspects of embodiments of the present invention may be written in any combination of one or more programming languages, including object-oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations or block diagrams of methods, apparatus (systems), and computer program products. Each block of the flowchart illustrations or block diagrams, and combinations of blocks in the flowchart illustrations or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified by the flowchart or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function or act specified by the flowchart or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions or acts specified in the flowcharts or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 6 are not intended to limit the present invention. Indeed, other alternative hardware and program environments may be used without departing from the scope of embodiments of the invention.

What is claimed is:

1. A computer-implemented method to grant a managed device access to a managed group while safeguarding against network sniffing, the computer-implemented method comprising:

exchanging identification information between a management device in the managed group and the managed device through a secure channel comprising a bus operatively connecting only the managed group, wherein the identification information includes at least one of an Internet Protocol (IP) address of the managed device and a universally unique identifier (UUID) of the managed device;

upon successfully verifying the identification information by the management device, granting, through the secure channel and not over an unverified network, the managed device access to the managed group, wherein the unverified network comprises a network not verified to safeguard against network sniffing; and upon unsuccessfully verifying the identification information by the management device, exchanging, between the managed device and the management device over the unverified network and through an encrypted communication session established based on a cryptographic key, certificate information in order to grant the managed device access to the managed group;

wherein the managed group is not permitted to communicate with any device to which access to the managed group is not granted, wherein once the managed device is granted access, the managed group is accessible to the managed device through a secure communication session on the unverified network, wherein the secure communication session has a greater bandwidth than the secure channel.

2. The computer-implemented method of claim 1, further comprising the management device sending the cryptographic key to the managed device through the secure channel upon unsuccessfully verifying the identification information.

3. The computer-implemented method of claim 1, wherein the granting of access by the management device includes increasing electrical power to the managed device.

4. The computer-implemented method of claim 1, wherein the granting of access by the management device includes allowing the managed device to complete a boot-up sequence.

5. The computer-implemented method of claim 1,
wherein the managed group comprises a plurality of devices interconnected by one or more communication channels and one or more networks that permit sharing of resources between the plurality of devices, wherein the sharing is controlled by the management device, wherein the identification information comprises an identification record.

6. The computer-implemented method of claim 1, wherein the management device manages workload distribution among the managed group and further manages data distribution among the managed group, wherein the management device functions as a managed device when attempting the join a second managed group different from the managed group, wherein the secure channel is selected from an Inter-Integrated Circuit (I²C) bus and a Recommended Standard 485 (RS-485) bus, wherein the unverified network is selected from an Ethernet network and a Transport Control Protocol (TCP) network.

7. The computer-implemented method of claim 5, wherein granting access to the managed group comprises exchanging certificate information between the management device and managed device, comprising: (i) the managed device transmitting a certificate signing request to the management device, the certificate signing request including a certificate identifying the managed device; and (ii) the management device signing and returning the certificate identifying the managed device and sending, to the managed device, a copy of a certificate identifying the management device; wherein the secure channel is trusted, wherein the unverified network is untrusted.

8. The computer-implemented method of claim 6, wherein the management device initiates and establishes the secure channel responsive to, in respective instances, each of:
(i) installation of the managed device in the blade system;
(ii) a first attempt by the managed device to access the management device;
(iii) a restart of both of the managed device and the management device;
(iv) being notified of presence of the managed device in the blade system; and
(v) receiving, from a requesting entity, a request specifying to establish the secure channel.

9. The computer-implemented method of claim 7, wherein the secure channel, the encrypted communication session, and the secure communication session each is verified to safeguard against network sniffing, wherein the encrypted communication session and the secure communication session are different communication sessions, wherein the unverified network is selected from a secure network and an insecure network;
wherein the signed certificate identifying the managed device and the certificate identifying the management device together permit the managed device to communicate with one or more devices in the managed group while precluding a network sniffer on the unverified network from successfully extracting any information being communicated, wherein absent at least one of the signed certificate identifying the managed device and the certificate identifying the management device, no device in the managed group is permitted to communicate with the managed device.

10. The computer-implemented method of claim 8, further comprising:
only upon unsuccessfully verifying the identification information by the management device, sending, by the management device, the cryptographic key to the managed device through the secure channel.

11. The computer-implemented method of claim 9, wherein each device in the managed group has: (i) its own identifying certificate signed by the management device and (ii) a respective copy of the certificate identifying the management device; wherein communicating with one or more devices in the managed group comprises providing user credential information for a predefined server, wherein the predefined server comprises a Lightweight Directory Access Protocol (LDAP) server, wherein each device in the managed group comprises a distinct blade of a blade system, wherein the identification information includes:
(i) a date and time of last communication of the managed device with the management device;
(ii) the IP address of the managed device;
(iii) port information of the managed device; and
(iv) the UUID of the managed device.

12. The computer-implemented method of claim 10, wherein the certificate information is exchanged over the secure channel only upon successfully verifying the identification information, wherein the certificate information is exchanged in the encrypted communication session over the unverified network only upon successfully verifying the identification information.

13. The computer-implemented method of claim 12, wherein the managed device, once granted access to the managed group, communicates over the unverified network with a device of the managed group in a secure communication session using the certificate information, wherein the secure communication session is based on a predefined protocol, wherein the predefined protocol comprises, in respective instances, Secure Socket Layer (SSL) and Transport Layer Security (TLS).

14. The computer-implemented method of claim 13, wherein the management device controls electrical power supplied to the managed device and further controls a capability of the managed device to complete a boot-up sequence, wherein the boot-up sequence pertains to an auxiliary processor of the managed device, wherein the management device has two or more Central Processing Units (CPUs), wherein the cryptographic key comprises an Advanced Encryption Standard (AES) key, wherein the encrypted communication session comprises an AES-256 encrypted communication session.

15. The computer-implemented method of claim 14, further comprising:
   in a first instance, accessing a database by the management device in order to verify the identification information of the managed device, wherein the identification information is verified only upon a search of the database yielding a match comprising a record specifying a time and date of a previous granting of access to the managed device, the specified time and date not exceeding a predefined staleness duration relative to a time of verification of the identification information, wherein the database is updated based on the identification information of the managed device.

16. The computer-implemented method of claim 15, wherein in a second instance, the identification information of the managed device is successfully verified without accessing the database; wherein the granting of access by the management device includes, in respective instances: (i) increasing electrical power to the managed device and (ii) permitting the managed device to complete the boot-up sequence.

17. A system to grant communications between devices while safeguarding against network sniffing, the system comprising:
   a managed device having identification information, wherein the identification information includes at least one of an Internet Protocol (IP) address of the managed device and a universally unique identifier (UUID) of the managed device;
   a management device to verify the identification information;
   a secure channel comprising a bus operatively connecting only the managed group, including operatively connecting the managed device with the management device, wherein the managed device and the management device exchange the identification information over the secure channel; and
   an unverified network operatively connecting the management device with the managed device, wherein the unverified network comprises a network not verified to safeguard against network sniffing;
   wherein the management device is operable to:
      upon successfully verifying the identification information, provide, through the secure channel and not over the unverified network, the managed device with access to a managed group having one or more managed devices; and
      upon unsuccessfully verifying the identification information by the management device, exchanging, between the managed device and the management device over the unverified network and through an encrypted communication session established based on a cryptographic key, certificate information in order to grant the managed device access to the managed group;
   wherein the managed group is not permitted to communicate with any device to which access to the managed group is not granted, wherein once the managed device is provided with access, the managed group is accessible to the managed device through a secure communication session on the unverified network, wherein the secure communication session has a greater bandwidth than the secure channel.

18. The system of claim 17, wherein the management device sends the cryptographic key to the managed device using the secure channel upon unsuccessfully verifying the identification information.

19. The system of claim 17, wherein the management device controls electrical power supplied to the managed device.

20. The system of claim 17, wherein the management device controls a capability of the managed device to complete a boot-up sequence.

21. A computer-readable storage device to grant a managed device access to a managed group while safeguarding against network sniffing, the computer-readable storage device including hardware and encoded with instructions executable to:
   exchange identification information between the managed device and a management device for the managed group through a secure channel comprising a bus operatively connecting only the managed group, wherein the identification information includes at least one of an Internet Protocol (IP) address of the managed device and a universally unique identifier (UUID) of the managed device;
   upon successfully verifying the identification information by the management device, grant, through the secure channel and not over an unverified network, the managed device access to the managed group, wherein the unverified network comprises a network not verified to safeguard against network sniffing; and
   upon unsuccessfully verifying the identification information by the management device, exchanging, between the managed device and the management device over the unverified network and through an encrypted communication session established based on a cryptographic key, certificate information in order to grant the managed device access to the managed group;
   wherein the managed group is not permitted to communicate with any device to which access to the managed group is not granted, wherein once the managed device is granted access, the managed group is accessible to the managed device through a secure communication session on the unverified network, wherein the secure communication session has a greater bandwidth than the secure channel.

22. The computer-readable storage device of claim 21, wherein the instructions are further executable to send, by the management device, the cryptographic key to the managed device through the secure channel upon unsuccessfully verifying the identification information.

23. The computer-readable storage device of claim 21, wherein the providing of access by the management device includes increasing electrical power to the managed device.

24. The computer-readable storage device of claim 21, wherein the providing of access by the management device includes allowing the managed device to complete a boot-up sequence.

* * * * *